United States Patent
Caviglia et al.

(10) Patent No.: US 8,325,737 B2
(45) Date of Patent: Dec. 4, 2012

(54) LABEL SWITCHED PATH NETWORKING

(75) Inventors: Diego Caviglia, Genoa (IT); Attila Takacs, Budapest (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 361 days.

(21) Appl. No.: 12/525,941

(22) PCT Filed: Feb. 7, 2008

(86) PCT No.: PCT/EP2008/051496
§ 371 (c)(1),
(2), (4) Date: Dec. 22, 2009

(87) PCT Pub. No.: WO2008/095976
PCT Pub. Date: Aug. 14, 2008

(65) Prior Publication Data
US 2010/0103942 A1    Apr. 29, 2010

(30) Foreign Application Priority Data
Feb. 9, 2007   (GB) .................................. 0702508.3

(51) Int. Cl.
*H04L 12/28* (2006.01)
*H04L 12/56* (2006.01)
*H04J 3/16* (2006.01)
*H04J 3/22* (2006.01)
*G06F 15/16* (2006.01)

(52) U.S. Cl. ......... 370/400; 370/392; 370/468; 709/235

(58) Field of Classification Search .......... 370/231–238, 370/392–410, 241–352; 709/229–235
See application file for complete search history.

(56) References Cited

U.S. PATENT DOCUMENTS
6,628,649 B1 * 9/2003 Raj et al. ....................... 370/360
(Continued)

FOREIGN PATENT DOCUMENTS
WO   2005/119978   12/2005

OTHER PUBLICATIONS

Takacs et al., "GMPLS RSVP-TE extension in Support of Bidirectional LSPs with Asymmetric Bandwidth Requirements; Draft-Takacs-Asym-bw-1sp-00.txt", IETF Standard-Working-Draft, Internet Engineering Task Force, IETF, CH, Feb. 1, 2007, XP015050462.

(Continued)

*Primary Examiner* — Man Phan
(74) *Attorney, Agent, or Firm* — Nixon & Vanderhye P.C.

(57) ABSTRACT

A network arranged to implement label switched paths, comprising: an ingress label edge router (LER), at least one label switching router (LSR), and an egress LER, in which the ingress LER is connected to the egress LER via one or more of the LSRs. In said network the ingress LER is arranged to transmit, in use, a path message for setting up a bidirectional label switched path (LSP) from the ingress LER to the egress LER via at least one LSR in response for a request for such an LSP. The path message is transmitted over the path of the LSP to be created, in which the path message comprises a first parameter indicative of the bandwidth to be assigned to data traversing the LSP in a first, downstream, direction from ingress LER to egress LER and a second parameter indicative of the bandwidth to be assigned to data traversing the LSP in an opposite, upstream, direction, in which the upstream and downstream bandwidths are different.

18 Claims, 1 Drawing Sheet

U.S. PATENT DOCUMENTS

| | | | | |
|---|---|---|---|---|
| 6,973,504 | B2* | 12/2005 | Nomura | 709/235 |
| 7,170,869 | B2* | 1/2007 | Yang et al. | 370/328 |
| 7,283,477 | B1* | 10/2007 | Fedyk et al. | 370/237 |
| 7,298,700 | B1* | 11/2007 | Doverspike et al. | 370/235 |
| 7,359,377 | B1* | 4/2008 | Kompella et al. | 370/389 |
| 7,596,140 | B2* | 9/2009 | Chen et al. | 370/392 |
| 7,782,772 | B2* | 8/2010 | Doverspike et al. | 370/230 |
| 7,903,651 | B2* | 3/2011 | Kompella et al. | 370/389 |
| 2003/0053484 | A1 | 3/2003 | Sorenson et al. | |
| 2006/0262774 | A1* | 11/2006 | Moldestad et al. | 370/352 |
| 2007/0133398 | A1* | 6/2007 | Zhai | 370/228 |
| 2007/0242605 | A1* | 10/2007 | Lei | 370/228 |
| 2011/0128968 | A1* | 6/2011 | Kompella et al. | 370/410 |

OTHER PUBLICATIONS

Rohit Dube et al., "Bi-directional LSPS for Classical MPLS; Draft-dube-bidirectional-1sp-01.txt", IETF Standard-Working-Draft, Internet Engineering Task Force, IETF, CH, No. 1, Jul. 1, 2003, XP015012574.

Don Fedyk et al., "GMPLS Control of Ethernet; Draft-fedyk-gmpls-ethernet-pbt-00.txt", IETF Standard-Working-Draft, Internet Engineering Task Force, IETF, CH, Jun. 1, 2006, XP01504514.

Berger et al., "Generalized Multi-Protocol Label Switching (GMPLS) Signaling Functional Description; rfc3471. txt", IETF, Standard, Internet Engineering Task Force, IETF, CH, Jan. 1, 2003, XP015009254.

Berger et al., "Generalized Multi-Protocol Label Switching (GMPLS) Signaling; rfc3473.txt", IETF Standard, Internet Engineering Task Force, IETF, CH, Jan. 1, 2003, XP015009256.

R. Aggarwal, "MPLS Upstream Label Assignment and Context Specific Label Space", IETF Standard, Network Working Group, Dec. 1, 2006, pp. 1-9, XP002482136.

* cited by examiner

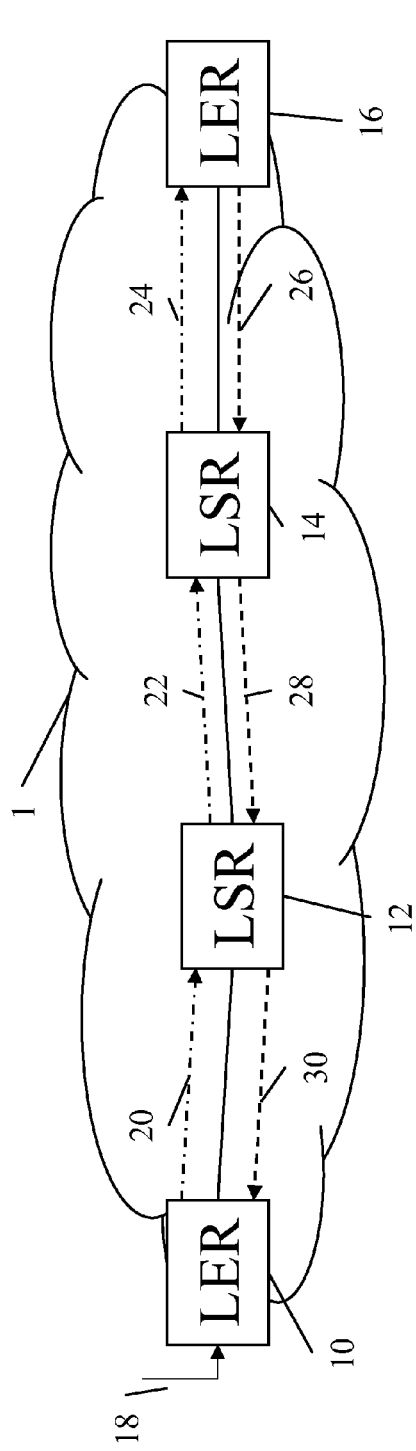
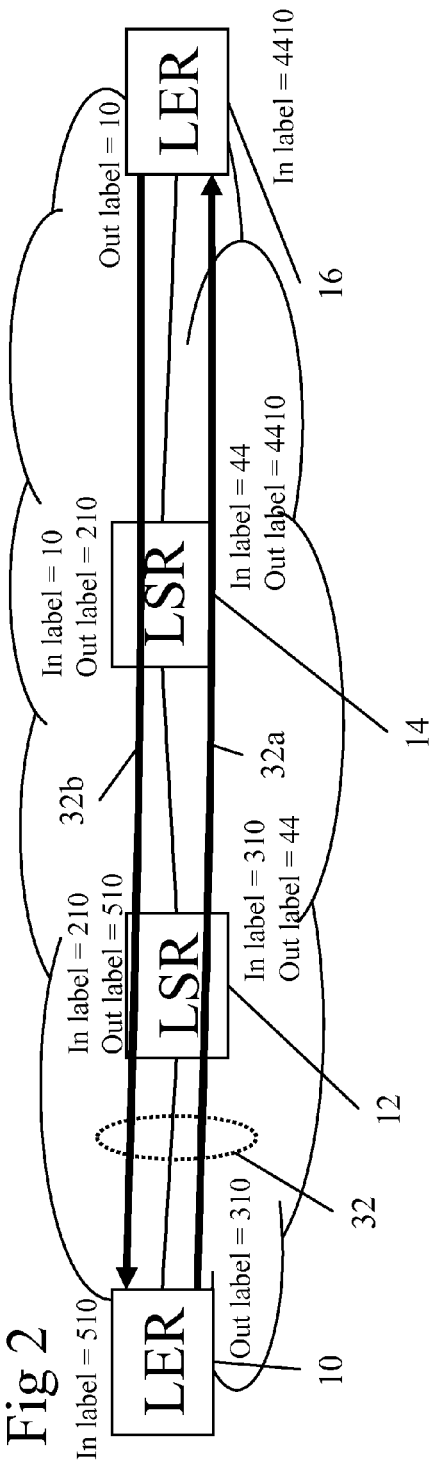
Fig 1
Fig 2

LABEL SWITCHED PATH NETWORKING

This application is the U.S. national phase of International Application No. PCT/EP2008/051496, filed 7 Feb. 2008, which designated the U.S. and claims priority to Great Britain Application No. 0702508.3 filed 9 Feb. 2007, the entire contents of each of which are hereby incorporated by reference.

This technology relates to a method of setting up a label switched path through a network, a data signal for use in creating such paths, label switching routers and label edge routers and a network using such routers.

Multi-Protocol label Switching MPLS is a well-known data-carrying mechanism, which emulates a circuit-switched connection over a packet-based network. It is described in Internet Engineering Task Force (IETF) Request for Comments (RFC) number 3031 (herein RFC followed by a number shall refer to the IETF RFC of that number; such documents are available at http://www.rfc-editor.org/). The Resource Reservation Protocol Traffic Engineering (RSVP-TE) extension to this protocol described in RFC3209 sets forth a procedure for defining a Label Switched Path (LSP) using MPLS, wherein the bandwidth desired for the path is specified when the path is created.

A label switched path is a path through a network from a label edge router (LER) via any number of label switching routers (LSRs) to another label edge router. At the "ingress" edge router, a label is prepended to each packet incident on the network, based upon a "forward equivalence class" (FEC) of that packet; all packets that are to be treated in the same way across the network will be assigned the same label. For example, all packets that are to be sent to a particular subnet may be assigned to one particular FEC. The label indicates which LSR the LER should send the packet to. Once the first LSR has received the packet, the LSR switches the label with another label, based on the content of the first label, and forwards the packet based on the new label. Once the packet reaches the "egress" LER, the label is stripped from the packet and distributed onwards.

In order to set up the LSP, a path setup protocol must be used. Using RSVP-TE, a uni-directional LSP can be set up, whereby a path message is passed from ingress LER via the LSRs to the egress LSR. One parameter of the path message indicates the amount of bandwidth that is to be reserved for use by the LSP. Once the path message reaches the egress LSR, a "resv" or reservation message is passed backwards along the LSP, defining the bandwidth that is to be reserved based on the parameter of the path message. The reservation message also typically includes, on each hop from router to router, the label to be applied by the router receiving the reservation message to packets traversing that hop along the LSP in the opposite direction. Thus, defined allocation of bandwidth can be achieved, and the network can ensure that the reserved bandwidth is generally if not always available for the LSP.

In RSVP-TE according to RFC 3209, in order to establish a bidirectional data flow, two separate LSPs are set up; one in each direction. Two separate path messages must be transmitted, with the associated computational and transmission overheads. In the worst-case scenario, the delay could be up to twice the path message transmission delay. Furthermore, as the paths are being set up separately, there are possibilities for race conditions existing, whereby the resources necessary for assigning one path could end up being assigned to the other path.

Accordingly, RFC3471 introduced GMPLS RSVP-TE, which allowed for bidirectional LSP setup, via a modified path message. It also extended the MPLS concept to control of other networking technologies, such as SONET/SDH, OTN (Optical Transport Network), Ethernet and so on. Since traditional connection orientated circuit switched (co-cs) transport technologies such as SONET/SDH generally assume bidirectional symmetrical connections, GMPLS RSVP-TE adds support for that kind of connection. RFC3471 section 4 lists several reasons why bidirectional links may be preferable to two unidirectional links.

According to a first aspect, we provide a method of setting up a bidirectional label switched path (LSP) within a network, comprising setting up a bidirectional label switched path with asymmetric bandwidth allocation.

By asymmetric bandwidth allocation, we mean that the bandwidth allocated to traffic passing through the LSP in one direction is different to that allocated to traffic passing through the LSP in the other direction. Typically, this represents a reservation of available bandwidth to the LSP in the appropriate directions.

By being able to set up a bidirectional LSP in a single signalling exchange, the overhead in making two unidirectional LSPs may be avoided, or at least reduced. Furthermore, asymmetric bandwidth allocation is more flexible, in that the allocation to the LSP is not constrained to be the same in each direction. This is especially important as, in today's network environments, applications such as video streaming which are inherently asymmetric users of bandwidth are becoming more common. There is no longer any need to set up two different unidirectional LSPs.

The LSP may be from an ingress label edge router (LER), via at least one label switching router (LSR) to an egress label edge router. The method may comprise the step of passing a path message from the ingress LER to the egress LER along the LSP to be set up. The path message may comprise a first parameter indicative of the bandwidth to be allocated to the LSP in a downstream direction from the ingress LER to the egress LER and a second parameter indicative of the bandwidth to be allocated to the LSP in an upstream direction from the egress LER to the ingress LER. The first and second parameters may be indicative of different bandwidths.

Either of the first or second parameters may also be indicative of general traffic characteristic description, including such values as quality of services (QoS) class, delay, jitter, loss requirements and so on.

The method may also comprise the step of transmitting a reservation message from the egress LER to the ingress LER along the LSP to be set up in response to the path message being received by the egress LER. The reservation message may comprise a third parameter indicative of the bandwidth to be allocated to the LSP in the downstream direction. The bandwidths indicated by the third and first parameters may be the same, and may be different to that indicated by the second parameter.

During each hop between routers, the path message may comprise an upstream label indicative of the label to be applied by the router to which the path message is being transmitted on that hop to packets travelling in the upstream direction. Similarly, during each hop from one router to the next, the reservation message may comprise a downstream label indicative of the label to be applied by the router to which the reservation message is being transmitted on that hop to packets travelling in the downstream direction.

In the preferred embodiment, the method comprises the transmission of only one path message, and preferably involves the transmission of a path message only from ingress LER to egress LER and not in the other direction. Similarly, the method may comprise the transmission of only one reservation message, and preferably comprises the transmission of the reservation message from egress LER to ingress LER and not in the other direction.

Typically, the network will be a packet switched network such as an IP or Ethernet network. However, the implementation is not necessarily so limited and the network could be implemented with other technologies, such as Time Division Multiplexing, lambda switching, etc. or any network capable of implementing GMPLS RSVP-TE under RFC3473.

The path message may be of the form of a path message according to RFC3473, comprising an upstream_label object forming the upstream label and a sender_tspec object encoding the first parameter, the path message being extended from that of RFC3473 by comprising an upstream tspec object encoding the second parameter. Typically, the encoding of the upstream tspec object will be the same as that of the sender_tspec object of RFC3473.

According to a second aspect, there is provided a data signal encoding a path message for setting up a bidirectional label switched path (LSP), in which the data signal comprises a first parameter indicative of the bandwidth to be assigned to data traversing the LSP in a first, downstream, direction and a second parameter indicative of the bandwidth to be assigned to data traversing the LSP in a second, upstream, direction, in which the upstream and downstream bandwidths are different.

Again, this allows an asymmetric bidirectional label switched path to be created, which may provide for more flexible control of bandwidth than previously possible.

In use, during each hop between routers on the LSP, the path message may comprise an upstream label indicative of the label to be applied by the router to which the path message is being transmitted on that hop to packets travelling in the upstream direction.

The path message may be of the form of a path message according to RFC3473, comprising an upstream_label object forming the upstream label and a sender_tspec object encoding the first parameter, the path message being extended from that of RFC3473 by comprising an upstream tspec object encoding the second parameter. Typically, the encoding of the upstream tspec object will be the same as that of the sender_tspec object of RFC3473.

According to a third aspect, there is provided use of the data signal of the second aspect as the path message of the first aspect.

According to a fourth aspect, there is provided a label edge router for a network implementing label switched paths (LSPs), in which the router is arranged to act as an ingress router for a LSP, and is arranged to emit, in use, a data signal according to the second aspect in response to a request for a bidirectional label switched path.

According to a fifth aspect, there is provided a label switching router, arranged to, in use, take as an input the data signal of the second aspect and to allocate bandwidth to a bidirectional label switched path (LSP) in the opposite direction to which the path message is travelling based upon the second parameter in the path message.

Preferably, the label edge router also has an input for a reservation message travelling in the opposite direction to the path message, in which the router is arranged to allocate, in use, an amount of bandwidth to the LSP in the opposite direction to which the reservation message is travelling dependent upon a parameter in the reservation message.

According to a sixth aspect, there is provided a label edge router for a network implementing label switched paths (LSPs), in which the router is arranged to act as an egress router for a LSP, and is arranged to receive, in use, a data signal according to the second aspect and to emit a reservation signal a comprising the first parameter in use in response thereto.

According to a seventh aspect, there is provided a network arranged to implement label switched paths, comprising:
  an ingress label edge router (LER);
  at least one label switching router (LSR); and
  an egress LER,
    in which the ingress LER is connected to the egress LER via one or more of the LSRs,
and in which the ingress LER is arranged to transmit, in use, a path message for setting up a bidirectional label switched path (LSP) from the ingress LER to the egress LER via at least one LSR in response for a request for such an LSP, the path message being transmitted over the path of the LSP to be created, in which the path message comprises a first parameter indicative of the bandwidth to be assigned to data traversing the LSP in a first, downstream, direction from ingress LER to egress LER and a second parameter indicative of the bandwidth to be assigned to data traversing the LSP in an opposite, upstream, direction, in which the upstream and downstream bandwidths are different.

Preferably, the or each LSR is arranged such that, on receipt of the path message from the ingress LER or a intermediate LSR connected between LSR and the ingress LER, the LER allocates bandwidth to the LSP in the upstream direction based upon the second parameter in the path message.

Preferably, the egress LER is arranged to receive, in use, the path message and to emit a reservation signal to the ingress LER via one or more of the LSRs comprising the first parameter in use in response thereto. In response to the reservation signal, the or each LSR may be arranged to allocate bandwidth to the LSP in the downstream direction dependent upon the first parameter.

The network may be arranged such that LSPs can be created according to the method of the first aspect.

There now follows, by way of example only, description of an embodiment, described with reference to the accompanying drawings, in which:

FIG. 1 shows the passage of a path message through a network to set up a Label Switched Path (LSP) in accordance with an embodiment; and FIG. 2 shows the LSP set up through the network of FIG. 1.

A network 1 has been schematically depicted in the accompanying Figures. It has been shown as having a first Label Edge Router (LER) 10 connected to a first Label Switching Router (LSR) 12, itself connected to a second LSR 14, which is connected to a second LER 16. This is, of course, an extremely simplified network; typical networks would have many LERs interconnected by many LSRs. It would typically be a connection orientated packet switched network such as IP/MPLS or GMPLS controlled Ethernet.

According to this example embodiment, it is possible to create a bidirectional label switched path (LSP) between the first 10 and second 16 LERs, wherein different bandwidths can be reserved for the downstream direction (from first LER 10, nominally the ingress router, to second LER 16, nominally the egress router) and the upstream direction (second LER to first LER). This is schematically depicted in FIG. 1 of the accompanying drawings.

In order to set up the LSP, a connection request is made to an external input 18 of the first LER. The connection request states that a bidirectional LSP is required, having allocated to it a downstream bandwidth indicated by downstream_bw and an upstream bandwidth indicated by upstream_bw. These values can be encoded in any suitable fashion; one possible scheme is described in section 3.1.2 of RFC3471.

The first LER 10 then transmits a path message 20 to first LSR 12. The path message is of the form of a path message setting up a bidirectional LSP according to RFC3473, with the change that the path message also contains an UPSTREAM_TSPEC object. This has the same format as the SENDER_TSPEC that is present by standard in such a path message. In the embodiment, the UPSTREAM_TSPEC is used to set the upstream bandwidth allocation, and the SENDER_TSPEC object is used to set the downstream bandwidth allocation.

Accordingly, the path message 20 sent from LER 10 to LSR 12 has the following parameters:
SENDER_TSPEC:=downstream_bw
UPSTREAM_LABEL:=510
UPSTREAM_TSPEC:=upstream_bw The UPSTREAM_LABEL object is discussed in RFC3473 as indicating the creating of a bidirectional LSP. As such, it sets the label to be set by the receiving router on packets travelling along the LSP in the upstream direction. Accordingly, it is arbitrarily set by the LER 10 in this case, but is noted by the LSR 12 as the label to apply on packets travelling from it along the LSP in the upstream direction. The LSR 12 also notes the bandwidth to be allocated to the LSP in the upstream direction and makes the necessary bandwidth allocation based on upstream_bw.

The first LSR 12 then transmits the path message in modified form 22 to second LSR 14. The modifications performed by the first LSR 12 are that the UPSTREAM_LABEL object is replaced by an arbitrary label which the second LSR 14 should apply to upstream packets transmitted from the second LSR 14 to the first LSR. Accordingly, the modified path message received by LSR 14 comprises the following objects:
SENDER_TSPEC:=downstream_bw
UPSTREAM_LABEL:=210
UPSTREAM_TSPEC:=upstream_bw Again, on reception of the path message 22, the second LSR notes the label to be applied to upstream packets, and the bandwidth upstream_bw to be applied to upstream packets. It then modifies the path message in the same way as the first LSR 12: it changes the UPSTREAM_LABEL object to the label that should be applied to upstream packets applied to it. This can be repeated for any number of LSRs. Accordingly, the further modified path message 24 transmitted by second LSR 14 to second LER 16 has the following objects:
SENDER_TSPEC:=downstream_bw
UPSTREAM_LABEL:=10
UPSTREAM_TSPEC:=upstream_bw The second LER 16, on receiving the path message 24, notes the UPSTREAM_LABEL that it is to transmit upstream packets with. It then transmits back to second LSR 14 a reservation or "resv" message. This is a standard message within RFC3473. It comprises, amongst others, two parameters: FLOWSPEC, which indicates the bandwidth to be reserved for the LSP in the downstream direction, and LABEL, which indicates the label to be applied to downstream packets by the router receiving the resv message.

Again, on reception of the resv message, each router notes the current value of LABEL for use in labelling downstream packages to the router from which the resv message was received. It also allocates the bandwidth indicated by FLOWSPEC to the downstream direction of the LSP. It sets LABEL to a new value in the same fashion as the UPSTREAM_LABEL object in the path message 20, 22, 24, and retransmits the resv message upstream. Accordingly, the resv message 26 as transmitted by the second LER 16 to the second LSR 14 has the following parameters:
FLOWSPEC:=downstream_bw
LABEL:=4410

The resv message 28 as modified by the second LSR 14 and transmitted to the first LSR 12 has the following parameters:
FLOWSPEC:=downstream_bw
LABEL:=44

Finally, the resv message 30 as modified by the first LSR 12 and transmitted to the first LER 10 has the following parameters:
FLOWSPEC:=downstream_bw
LABEL:=310

Once the first LER 10 receives the resv message, the bidirectional LSP is set up, and the network is in the state shown in FIG. 2 of the accompanying drawings. The LSP is depicted as 32, with the downstream channel shown as 32a and the upstream channel as 32b. The labels applied to packets in each direction, and received by each of the routers is shown. Packets for the LSP incident on the LERs 10, 16 will be applied the "out-label" indicated. Each router determines that a packet received with a given "in-label" is one traversing the LSP 32 and so should be retransmitted with the appropriate "out-label", for a LSR, or transmitted on in line with the parameters of the LSP and the packet in question, for the LERs.

For the downstream channel 32a, each of first 12 and second 14 LSRs and the second LER 14 check and reserve the bandwidth of the downstream channel 32a based on downstream_bw. Conversely, the second 14 and first 12 LERs and the first LSR 10 check and reserve the bandwidth of the upstream channel 32b based on upstream_bw.

Therefore, a bidirectional LSP 32 with asymmetric bandwidth allocation has been created with only one set of path/resv message exchanges, rather than two or more that would have been required for multiple unidirectional LSPs.

The invention claimed is:

1. A method of setting up a bidirectional label switched path (LSP) within a network, comprising:
    setting up a bidirectional label switched path with asymmetric bandwidth allocation in which the LSP is from an ingress label edge router (LER), via at least one label switching router (LSR), to an egress label edge router;
    passing a path message from the ingress LER to the egress LER along the LSP to be set up, in which the path message comprises a first parameter indicative of the bandwidth to be allocated to the LSP in a downstream direction from the ingress LER to the egress LER and a second parameter indicative of the bandwidth to be allocated to the LSP in an upstream direction from the egress LER to the ingress LER;
    transmitting a reservation message from the egress LER to the ingress LER along the LSP to be set up in response to the path message being received by the egress LER
    wherein during each hop from one router to the next, the reservation message comprises a downstream label indicative of the label to be applied by a router to which the reservation message is being transmitted on that hop to packets travelling through the LSP in the downstream direction.

2. The method of claim 1 in which the bandwidth allocated to traffic passing through the LSP in one direction is different to that allocated to traffic passing through the LSP in the other direction.

3. The method of claim 1 in which the LSP is from an ingress label edge router (LER), via at least one label switching router (LSR), to an egress label edge router.

4. The method of claim 1, in which the path message comprises a first parameter indicative of the bandwidth to be allocated to the LSP in a downstream direction from the ingress LER to the egress LER and a second parameter indicative of the bandwidth to be allocated to the LSP in an upstream direction from the egress LER to the ingress LER.

5. The method of claim 4 in which the first and second parameters are indicative of different bandwidths.

6. The method of claim 4, comprising the step of transmitting a reservation message from the egress LER to the ingress LER along the LSP to be set up in response to the path message being received by the egress LER.

7. The method of claim 6 in which the reservation message comprises a third parameter indicative of the bandwidth to be allocated to the LSP in the downstream direction.

8. The method of claim 7 in which the bandwidths indicated by the third and first parameters are the same, and are different to that indicated by the second parameter.

9. The method of any of claim 4, in which during each hop between routers, the path message comprises an upstream label indicative of the label to be applied by a router to which the path message is being transmitted on that hop to packets travelling through the LSP in the upstream direction.

10. The method of claim 1 in which the method comprises the transmission of only one path message.

11. The method of claim 6, in which the method comprises the transmission of only one reservation message.

12. The method of claim 6, in which the method comprises the transmission of the reservation message from egress LER to ingress LER and not in the other direction.

13. The method of claim 1 in which the network is a packet switched network.

14. The method of claim 4, in which the path message comprises an upstream label_object forming the upstream label, and a sender_tspec object encoding the first parameter, and an "upstream tspec" object encoding the second parameter.

15. A network arranged to implement label switched paths, comprising:
   an ingress label edge router (LER);
   at least one label switching router (LSR); and
   an egress LER,
   in which the ingress LER is connected to the egress LER via one or more of the LSRs,
   in which the ingress LER is arranged to transmit, in use, a path message for setting up a bidirectional label switched path (LSP) from the ingress LER to the egress LER via at least one LSR in response for a request for such an LSP, the path message being transmitted over the path of the LSP to be created, in which the path message comprises a first parameter indicative of the bandwidth to be assigned to data traversing the LSP in a first, downstream, direction from ingress LER to egress LER and a second parameter indicative of the bandwidth to be assigned to data traversing the LSP in an opposite, upstream, direction, in which the upstream and downstream bandwidths are different,
   in which the egress LER is arranged to receive, in use, the path message and to emit a reservation signal to the ingress LER via one or more of the LSRs comprising the first parameter in use in response thereto, and
   in which, in use in response to the reservation signal, the or each LSR is arranged to allocate bandwidth to the LSP in the downstream direction dependent upon the first parameter.

16. The network of claim 15, in which the or each LSR is arranged such that, on receipt of the path message from the ingress LER or a intermediate LSR connected between LSR and the ingress LER, the LER allocates bandwidth to the LSP in the upstream direction based upon the second parameter in the path message.

17. The network of claim 15 in which the egress LER is arranged to receive, in use, the path message and to emit a reservation signal to the ingress LER via one or more of the LSRs comprising the first parameter in use in response thereto.

18. The network of claim 15 in which the network is arranged such that LSPs can be created.

* * * * *